(12) United States Patent
Fujita (10) Patent No.: US 12,066,972 B2
(45) Date of Patent: Aug. 20, 2024

(54) COMMUNICATION DEVICE AND ACTIVE CABLE

(71) Applicant: THINE ELECTRONICS, INC., Tokyo (JP)

(72) Inventor: Yusuke Fujita, Tokyo (JP)

(73) Assignee: THINE ELECTRONICS, INC., Tokyo (JP)

( * ) Notice: Subject to any disclaimer, the term of this patent is extended or adjusted under 35 U.S.C. 154(b) by 28 days.

(21) Appl. No.: 18/017,263

(22) PCT Filed: Aug. 11, 2021

(86) PCT No.: PCT/JP2021/029643
§ 371 (c)(1),
(2) Date: Jan. 20, 2023

(87) PCT Pub. No.: WO2022/034897
PCT Pub. Date: Feb. 17, 2022

(65) Prior Publication Data
US 2023/0281151 A1 Sep. 7, 2023

(30) Foreign Application Priority Data
Aug. 13, 2020 (JP) .................................. 2020-136672

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042
See application file for complete search history.

(56) References Cited

U.S. PATENT DOCUMENTS 6,101,312 A * 8/2000 Funayama ........... H04N 5/9315
386/E5.03
2019/0317774 A1 10/2019 Raghav et al.

FOREIGN PATENT DOCUMENTS

JP 05143905 A * 6/1993

OTHER PUBLICATIONS

English translation of JP-05143905-A (Year: 1993).*
(Continued)

*Primary Examiner* — Henry Tsai
*Assistant Examiner* — John B Roche
(74) *Attorney, Agent, or Firm* — Sughrue Mion, PLLC (57) ABSTRACT

The communication device 111 included in the active cable comprises a controller 11, a comparator 12, a resistor 13, a voltage source 14, and a redriver 16. The comparator 12 receives the voltage value of the SBU signal line and the reference voltage value output from the voltage source 14, and compares the voltage value of the SBU signal line with the reference voltage value to detect the level of the sideband signal. The controller 11 receives the detection result of the sideband signal level from the comparator 12, and sets the redriver 16, which is an active device, to the low-power-consumption state when the sideband signal level stays at L level for a predetermined period of time or longer.

20 Claims, 8 Drawing Sheets

(56) References Cited

OTHER PUBLICATIONS

Apple Inc., et al., "Universal Serial Bus 3.2 Specification", [online], URL: https://www.usb.org/document-library/usb-32-specificationreleased-september-22-2017-and-ecns, or URL:https://fabiensangland.net/usbcheat/usb3.2.pdf, USB 3.0 Promoter Group, Sep. 22, 2017, pp. 1-548.

Bob Dunstan, et al., "USB power Delivery", [online], URL: https://www.usb.org/document-library/usb-power-delivery, or URL: https://www.usb.org/sites/default/files/D2T2-1%20-%20Power%20Delivery.pdf, USB Implementers Forum, Nov. 20, 2019, pp. 1-104.

Apple Inc., et al., "Universal Serial Bus Type-C Cable and Connector Specification", [online], URL:http://caxapa.ru/thumbs/945953/USB4_1.0_20190829.pdf or URL: https://www.usb.org/document-library/usb4tmspecification, USB 3.0. Promoter Group, Aug. 2019, p. 12, 13, 17, 21-22, 76-77, 468-477.

Bob Dunstan, et al., "Universal Serial Bus Power Delivery Specification", revision 2.0, version 1.3, [online] URL:https://www.usb.org/document-library/usb-power-delivery, USB Implementers Forum, Jan. 12, 2017, pp. 1-547.

Apple Inc., et al., "Universal Serial Bus 4 (USB4™) Specification", [online],URL:http://caxapa.ru/thumbs/945953/USB4_1.0_20190829.pdf, or URL: https://www.usb.org/document-library/usb4tmspecification, USB 3.0. Promoter Group, Aug. 2019, p. 12, 13, 17, 21-22, 76-77, 468-477.

International Search Report for PCT/JP2021/029643 dated Sep. 14, 2021 [PCT/ISA/210].

International Preliminary Report on Patentability dated Feb. 23, 2023 with a Translation of the Written Opinion of the International Searching Authority in Application No. PCT/JP2021/029643.

\* cited by examiner

COMMUNICATION DEVICE AND ACTIVE CABLE

CROSS REFERENCE TO RELATED APPLICATIONS

This application is a National Stage of International Application No. PCT/JP2021/029643 filed Aug. 11, 2021, claiming priority based on Japanese Patent Application No. 2020-136672 filed Aug. 13, 2020.

TECHNICAL FIELD

The present invention relates to an active cable for performing communication between a first lane adapter and a second lane adapter, at least one of the lane adapters conforming to the USB4 standard, and the invention relates to a communication device provided in the active cable.

BACKGROUND ART

Universal Serial Bus (USB) is one of the serial bus standards for connecting peripheral devices to information devices such as computers. USB is the most popular general-purpose interface standard for current personal computer peripherals since USB 1.0, the first standard, appeared in 1996. The USB 3.2 standard (see Non-Patent Literature 1) was formally released in September 2017, and the USB4 standard (see Non-Patent Literature 2) was formally released in August 2019. USB4 is required to be backward compatible with USB 3.2.

A SS (Super Speed) signal is a main signal and its data rate (per 1 lane) is 5 Gbps in Gen1 of USB 3.2, 10 Gbps in Gen2 of USB 3.2, 10 Gbps in Gen2 of USB4, and 20 Gbps in Gen3 of USB4. The SS signal is a differential signal. The SS signal communication can use two lanes.

In USB4, a sideband use (SBU) communication line is provided in addition to the lanes for the SS signal communication. The data rate of the sideband signal is 1 Mbps. The sideband signal is single-ended and used for full-duplex bidirectional communication. However, the USB 3.2 standard does not provide the SBU communication line.

In USB4, power delivery communication (see Non-Patent Literature 3) is performed by CC communication line. The power delivery communication is single-ended and uses half-duplex communication.

Figure 1:
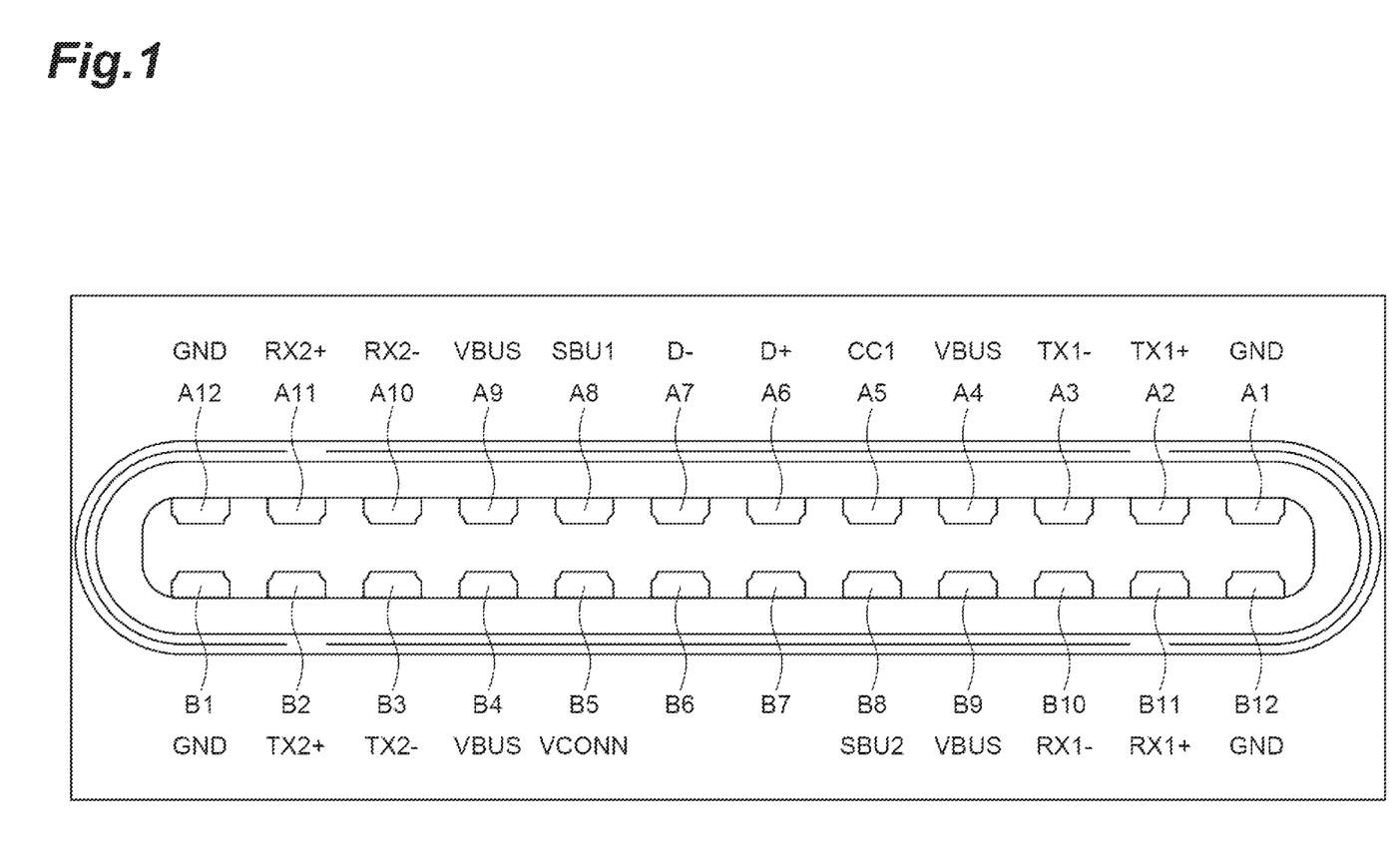
FIG. 1 is a diagram showing a terminal array of Type-C connector.

Type-C connector (see Non-Patent Literature 4) is used in USB4. FIG. 1 is a diagram showing a terminal array of Type-C connector. The connector for the cable comprises terminals A1, A2, A3, A4, A5, A6, A7, A8, A9, A10, A11, A12, B1, B2, B3, B4, B5, B6, B7, B8, B9, B10, B11, B12. In the SS signal (main signal) communication, the terminals A2 (TX1+), A3 (TX1−), B2 (TX2+), and B3 (TX2−) are used for transmitting signals, and the terminals B11 (RX1+), B10 (RX1−), A11 (RX2+), and A10 (RX2−) are used for receiving signals. In the sideband communication, the sideband use (SBU) terminals, that is, the terminal A8 (SBU1) and the terminal B8 (SBU2) are used. In the power delivery communication, the terminal A5 (CC1 (CC: Configuration Channel)) is used.

Figure 2:
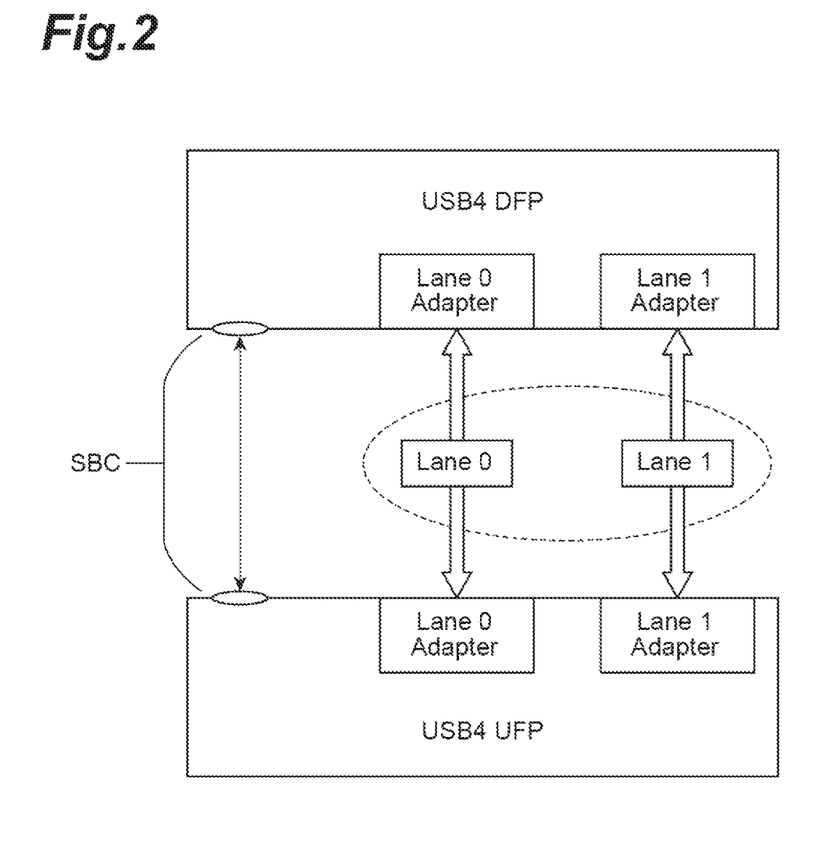
FIG. 2 is a diagram showing a configuration in which two devices are connected by a communication cable conforming to the USB4 standard.

FIG. 2 is a diagram showing a structure in which two devices are connected by a communication cable conforming to the USB4 standard. DFP (Downstream Facing Port) and UFP (Upstream Facing Port) are link partners. The DFP is provided on the host-side device, for example, an information device such as a computer. The UFP is provided on a device-side device, for example, a peripheral device such as a mouse or a display. A lane adapter (Lane Adapter) is provided in each of the DFP and the UFP, and functions as a main device of the SS signal communication by USB4. The DFP includes a lane 0 adapter and a lane 1 adapter. The UFP also includes a lane 0 adapter and a lane 1 adapter. Lane 0 and lane 1 are bonded. The USB lane comprises two differential-signal pairs (TX/RX). The sideband channel SBC is made of two wire channels.

The DFP and the UFP are connected to each other by the communication cable. If the length of the communication cable connecting the DFP and the UFP is short, a passive cable may be used as the communication cable. On the other hand, when the length of the communication cable is long (longer than 0.8 m in USB4), an active cable is required for the communication cable. The types of active cables include an active copper cable (ACC) that transmits an electrical signal and an active optical cable (AOC) that converts an electrical signal into an optical signal and transmits the optical signal.

The active cable includes an active device. The active device can perform an active operation to the main signal and is performed according to its power consumption amount. In the case of the ACC, the active device is a redriver, a retimer, or the like that corrects a loss of a signal (particularly, a loss in a high-frequency band). In the case of the AOC, the active device may be a laser diode that converts a current signal into an optical signal, a driver (laser driver) that drives the laser diode by supplying the current signal to the laser diode, a photodiode that converts an optical signal into a current signal, a transimpedance amplifier (TIA) that converts a current signal output from the photodiode into a voltage signal, or the like.

CITATION LIST

Non-Patent Literatures

[Non-Patent Literature 1] "The USB 3.2 Specification released on Sep. 22, 2017, and ECNs", [online], USB Implementers Forum, [Retrieved Aug. 6, 2020], the Internet <https://www.usb.org/document-library/usb-32-specification-released-september-22-2017-and-ecns>

[Non-Patent Literature 2] "USB4 Specification", [online], USB Implementers Forum, [Retrieved Aug. 6, 2020], the Internet <https://www.usb.org/document-library/usb4tm-specification>

[Non-Patent Literatures 3] "USB Type-C Cable and Connector Specification Revision 2.0", [online], USB Implementers Forum, [Retrieved Aug. 6, 2020], Internet <https://www.usb.org/document-library/usb-type-cr-cable-and-connector-specification-revision-20>

[Non-Patent Literature 4] "USB Power Delivery", [online], USB Implementers Forum, [Retrieved Aug. 6, 2020], Internet <https://www.usb.org/document-library/usb-power-delivery>

SUMMARY OF INVENTION

Technical Problem

In the configuration (FIG. 2) in which a DFP and a UFP are connected to each other by an active cable conforming to the USB4 standard, it is desirable to suppress the power consumption of an active device included in the active cable to a low level during a period in a sleep state in which communication of the SS signal is not performed between lane adapters of the DFP and the UFP. An active cable conforming to the USB 3.2 standard can detect that it is in the sleep state. However, the sleep state detection technique cannot be applied to an active cable conforming to the USB4 standard.

The present invention has been made to solve the above-described problem. The object is to provide a communication device that can set the active device to a low-power-consumption state with a simple configuration in the active cable in which communication is performed between a first lane adapter and a second lane adapter. At least one of the adapters conforms to the USB4 standard. The object is to provide an active cable including such a communication device.

Solution to Problem

A communication device according to the present invention is a device provided in an active cable that performs communication between a first lane adapter and a second lane adapter, at least one of the first and second lane adapters conforming to the USB4 standard, the communication device comprises: (1) one or more active devices configured to perform an active operation, which is performed according to its power consumption amount, to a main signal transmitted between the first lane adapter and the second lane adapter; and (2) a level detector configured to detect a level of a sideband signal transmitted between the first lane adapter and the second lane adapter; and (3) a controller configured to set any of the active devices to a low-power-consumption state when the level of the sideband signal detected by the level detector stays at L level for a period of time or more.

The active cable may be an active copper cable. In this case, it is preferable that the controller sets a redriver or a retimer to the low-power-consumption state when the level of the sideband signal detected by the level detector stays at L level for a predetermined time or longer. Each of the redriver and the retimer is one of the active devices.

The active cable may be an active optical cable. In this case, it is preferable that the controller sets a laser driver or a transimpedance amplifier to a low-power-consumption state when the level of the sideband signal detected by the level detector stays at L level for a predetermined time or longer. Each of the laser driver and the transimpedance amplifier is one of the active devices.

It is preferable that the controller sets a device or devices other than the active devices to a low-power-consumption state when the level of the sideband signal detected by the level detector stays at L level for a predetermined period of time or longer. Preferably, the controller adjusts an operation of any of the active devices when the level of the sideband signal detected by the level detector stays at L level for a predetermined period of time or longer.

It is preferable that the communication device of the present invention further comprises a resistor provided between an input terminal for the sideband signal, in the level detector and a reference potential supply terminal.

A communication device for the USB4 standard comprises: a comparator including a first input terminal connected to a sideband use (SBU) terminal and a second input terminal connected to a reference potential; a controller connected to an output terminal of the comparator and including an output terminal for low-power-consumption instruction signal output; and an active device connected to the output terminal of the controller. An active cable of the present invention includes the above-described communication device of the present invention.

In the present specification, the USB4 standard includes USB standard that is formulated as having USB4 compatibility after USB4.

Advantageous Effects of Invention

According to the present invention, at least one of the first and second lane adapters conforms to the USB4 standard, and the active cable can set the active device to a low-power-consumption state with a simple configuration. The communication is performed between the first and second lane adapters through the active cable.

DESCRIPTION OF EMBODIMENTS

Hereinafter, exemplary embodiments of the present invention will be described in detail with reference to the accompanying drawings. In the description of the drawings, the same elements are denoted by the same reference numerals, and redundant description is omitted. The present invention is not limited to these examples, but is defined by the claims and is intended to include all modifications within the meaning and range equivalent to the claims.

First, it will be described that the sleep state can be detected in the active cable conforming to the USB 3.2 standard, but the sleep state detection technique cannot be applied to the active cable conforming to the USB4 standard.

Figure 3:
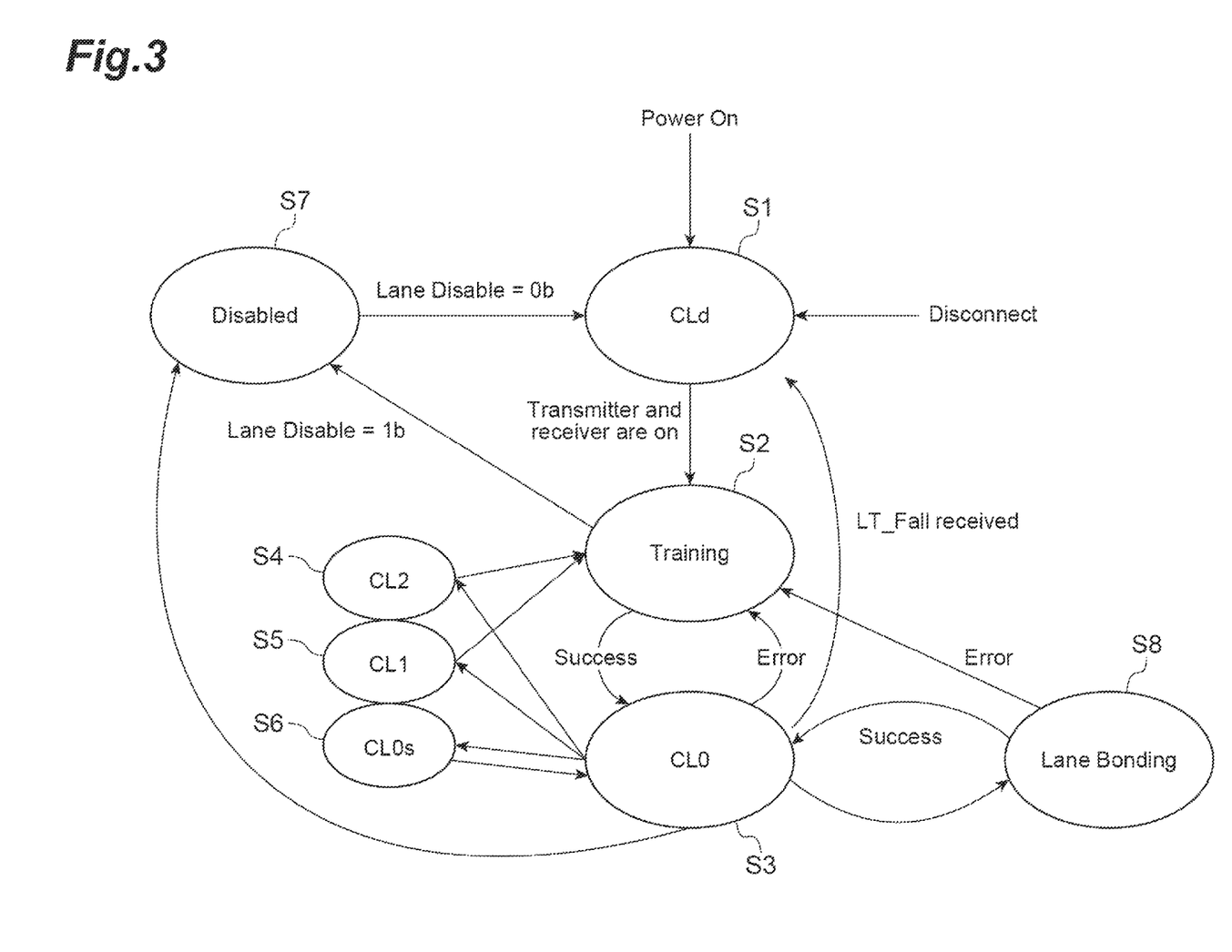
FIG. 3 is a state transition diagram showing a state machine of a lane adapter in the USB4 standard.

FIG. 3 is a state transition diagram showing the state machine of the lane adapter in the USB4 standard. Lane initialization is performed in the CLd state (S1) immediately after the power supply is turned on. In Training state (S2) after completion of the lane initialization, equalizer training is performed to establish a link between the DFP and the UFP. In the CL0 state (S3) after completion of the equalizer training, communication by the SS signal is performed between the lane adapters of the DFP and the UFP as a normal mode. In each state of CL0s state (S6), CL1 state (S5), and CL2 state (S4), communication by the SS signal is not performed between the lane adapters of the DFP and the UFP. After completion of the CL0s state (S6), the state returns to the CL0 state (S3). After completion of each state of CL1 state (S5) and CL2 state (S4), the state returns to Training state (S2). According to the USB4 standard, Disabled state (S7) indicates a state in which the lane adapter disables the lane, and the state becomes this state from Training state (S2) or CL0 state (S3) when the Lane Disable bit is set to 1 b (bit). Disabled state (S7) transitions to CLd state (S1) when the Lane Disable bit is set to 0 b (bit). When the Lane Bonding bit of the lane adapter is set to 1 b, the CL0 state (S3) becomes the Lane Bonding state (S8). In the Lane Bonding state (S8), two single lane links are combined into a dual lane link, and when the dual lane link succeeds, the state returns to the CL0 state (S3). When the USB4 port is disconnected or when the adapter receives an LT fall (lane disable event) transaction or an LT LRoff (disconnection or system sleep state) transaction, the state returns to the CLd state (S1).

The lane adapter state machine is a state machine in a physical logical layer. There is a router state machine in a configuration layer that is positioned higher than this layer. The sleep state of the router state machine is used in a sleep state in which SS signal communication is not performed between the lane adapters of the DFP and the UFP. During the sleep state, it is desirable to reduce the power consumption of the active devices included in the active cable. However, since the sleep state of the router state machine is in the upper configuration layer, it cannot be detected. Therefore, it is necessary to detect that it is in the sleep state based on the lane adapter state machine.

In USB 3.2, if the no-signal state of the SS signal continues for a predetermined period of time (320 ns) or more, it can be determined that the state is in the sleep state. However, this technology cannot be applied to USB4 because it is necessary to quickly return to a wake state in which communication of the SS signal is performed after the low-power-consumption state is set based on the detection of the sleep state.

In USB4, each state of CL0s, CL1, and CL2 is a low-power state. In the low-power state, the lane adapter does not perform communication of the SS signal. It is necessary to quickly return from each state of CL0s, CL1, and CL2 to the wake state.

When returning from CL0s state (S6) to CL0 state (S3), the lane adapter on either one side of DFP and UFP sends LFPS (Low Frequency Periodic Signaling) of at least 16 cycles to the lane adapter on the other side. The lane adapter on the other side receives this LFPS and returns from CL0s state (S6) to CL0 state (S3). Since the LFPS is sent only once, it needs to be transmitted from the lane adapter on one side to the lane adapter on the other side, and its transmission must not be disturbed by the active cable.

LFPS is a low speed toggle pattern signal transmitted between the lane adapters. The cycle of the LFPS is 20 to 80 ns, and 16 cycles of the LFPS are 320 ns at the shortest. Even if the sleep state is determined based on detection that no-signal state of the SS signal continues for a predetermined period of time or longer and the active device of the active cable is set to the low-power-consumption state, when returning from CL0s state (S6) to CL0 state (S3), it is necessary to quickly activate it to pass LFPS in response to the detection of the LFPS reception. However, it is difficult to pass the LFPS because it is hard to activate it in a short time equal to or shorter than 320 ns, and the activation time usually requires about 10 µs. Therefore, it is impossible to return from the CL0s state (S6) to the CL0 state (S3).

When returning from CL1 state (S5) or CL2 state (S4) to Training state (S2), the lane adapter on one side of either DFP or UFP sends the LFPS to the lane adapter on the other side. The lane adapter on the other side receives the transmitted LFPS and transmits the LFPS back to the lane adapter on the one side. The lane adapter that has transmitted the LFPS first continues to transmit the LFPS to the lane adapter on the other side until the LFPS returns from the lane adapter on the other side. Therefore, even if it takes time for the active device of the active cable to be activated from the low-power-consumption state, it is possible to return from the CL1 state (S5) or the CL2 state (S4) to the Training state (S2).

However, it is required to determine whether the state is in the CL0s state (S6), or the state is in the CL1 state (S5) or the CL2 state (S4). State transition information is transmitted by the high-speed SS signal between the lane adapters. This state transition information indicates a target state transited from the CL0 state (S3), and selected from the CL0s state (S6), the CL1 state (S5), and the CL2 state (S4) transited. Although the content of the high-speed SS signal may be decoded, circuit design for this process is not easy and the circuit size is large. Therefore, a simple circuit configuration cannot set the active device of the active cable to the low-power-consumption state in each state of CL0s state (S6), CL1 state (S5), and CL2 state (S4).

As described above, the sleep state detection technique in the active cable conforming to the USB 3.2 standard cannot be applied to the active cable conforming to the USB4 standard. If it is detected that the no-signal state of the SS signal continues for a predetermined period of time or longer, and it is determined that the state is in the sleep state based on this detection, and therefore the active device of the active cable is set to the low-power-consumption state, a deadlock occurs because it is impossible to return from the CL0s state (S6) to the CL0 state (S3) when the state is in the CL0s state (S6).

Figure 4:
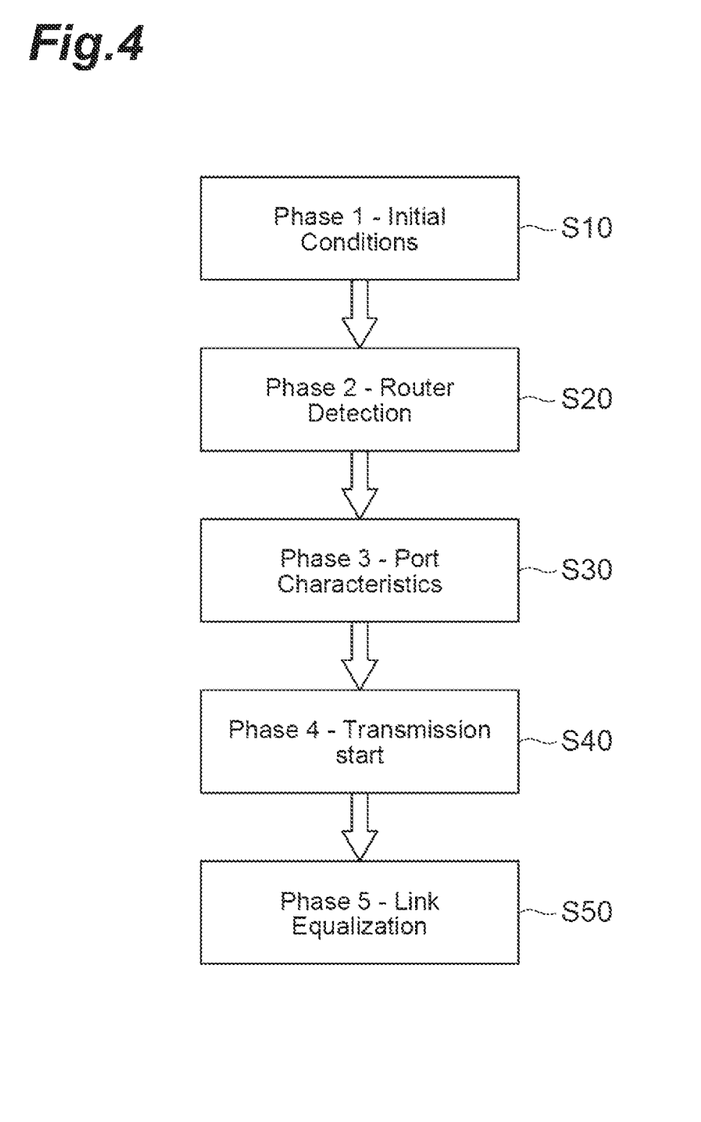
FIG. 4 is a flowchart of lane initialization performed by CLd state of a lane adapter in the USB4 standard.

The lane initialization process in the CLd state (S1) of the lane adapter is performed as follows. FIG. 4 is a flowchart of the lane initialization performed in the CLd state (S1) of a lane adapter in the USB4 standard. In the lane initialization, by the power delivery communication using the CC communication line and the sideband communication using the SBU communication line, it is determined as to whether of USB4 and USB 3.2 is used for the communication between the DFP and UFP lane adapters, which of the data rates is used for the communication, and the like. The procedure of the lane initialization includes Phase 1 to Phase 5.

In Phase 1 (S10) of the lane initialization, it is checked whether the devices of both link partners (DFP and UFP) and the active cable conform to the USB4 standard by power delivery communication using the CC communication line. If all of these devices conform to the USB4 standard, the communication by USB4 starts, and processing proceeds to Phase 2 (S20) and thereafter. On the other hand, when any one of them does not conform to the USB4 standard, the communication by USB 3.2 starts, and the processing does not proceed to Phase 2 and thereafter. During the period of Phase 1 (S10), the sideband signal is fixed to L level.

After Phase 2 (S20) of the lane initialization, by the sideband communication using the SBU communication line, it is determined which of the data rates is used for the communication and the like. On and after Phase 2 (S20), the sideband signal basically maintains H level. At the time of signal transmission, the sideband signal becomes L level (start bit) of one bit, an arbitrary level (symbol) of eight bits, and H level (stop bit) of one bit. After that, the sideband signal maintains H level.

The period of CLd state (S1) of the lane adapter state machine is a period of the lane initialization in which the SS signal communication is not performed, and the period of CLd state includes a period of sleep state of the router state machine. In Phase 1 (S10) of CLd state (S1), the sideband signal is fixed to L level, whereas in Phase 2 (S20) and thereafter, the sideband signal basically maintains H level. Therefore, by monitoring the level of the sideband signal, which is a low-speed signal, by using a simple circuit configuration, it is possible to detect that the device is in the Phase 1 (S10) of the CLd state (S1) of the lane adapter state machine, and it is possible to suppress the power consumption of the active device included in the active cable to a low level. According to the USB4 standard, in the lane initialization, connected router detection is performed in Phase 2 (S20), the router obtains the setting information of link partner to determine the USB4 port characteristics in Phase 3(S30), transmission starts in Phase 4 (S40), and the link equalization is performed in Phase 5 (S50).

The following configurations are explained based on the above-described consideration by the inventors.

Figure 5:
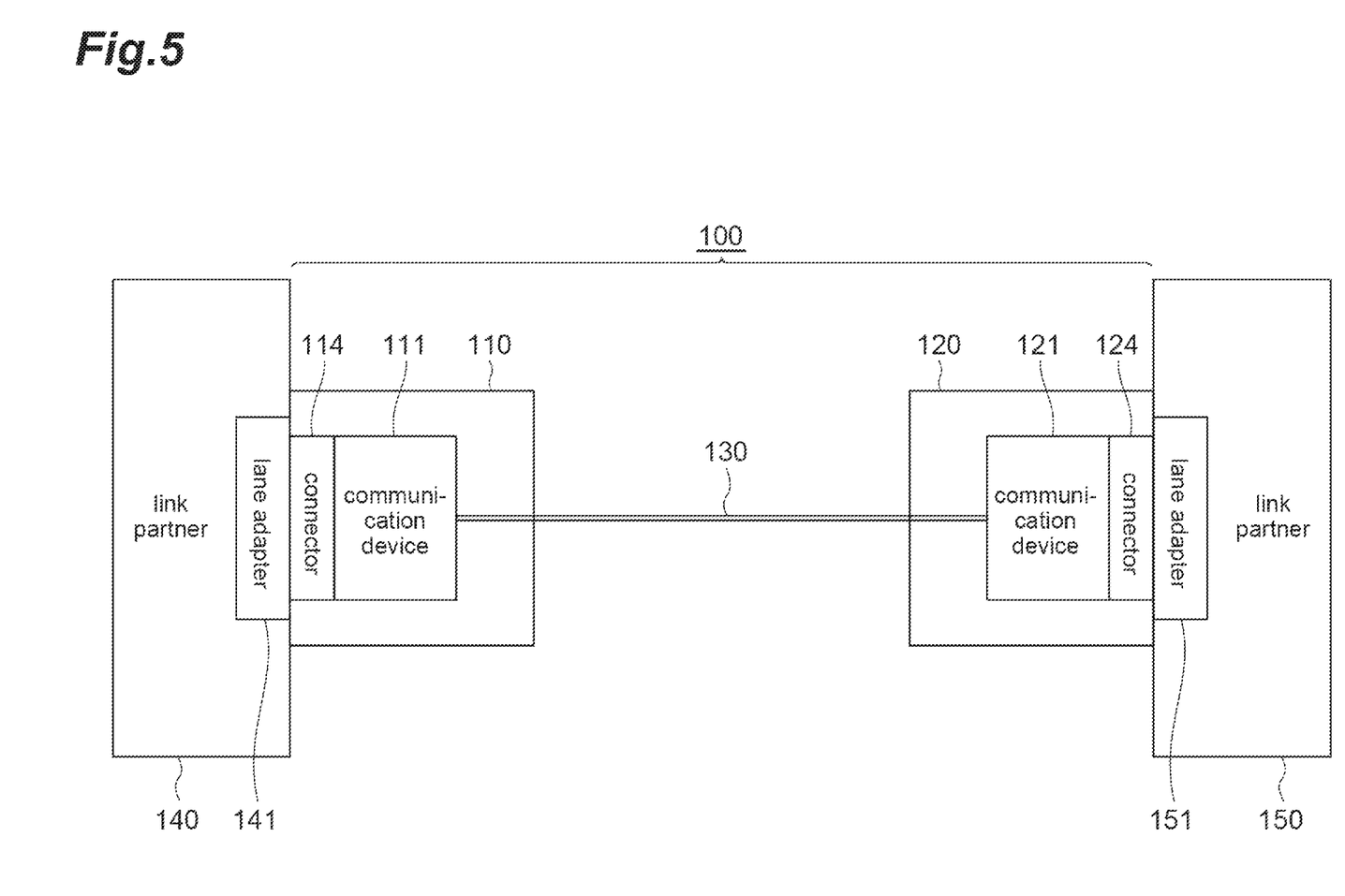
FIG. 5 is a diagram showing a configuration of an active cable 100 according to the first embodiment.

FIG. 5 is a diagram showing a configuration of the active cable 100 according to the first embodiment. The active cable 100 of the present embodiment is an active copper cable (ACC). The active cable 100 performs communication between the lane adapter 141 of one link partner 140 and the lane adapter 151 of the other link partner 150. At least one of the lane adapter 141 and the lane adapter 151 conforms to the USB4 standard.

The terminal device 110 on one side of the active cable 100 includes a communication device 111 and a connector 114. The connector 114 is connected to the lane adapter 141. The terminal device 120 on the other side of the active cable 100 includes a communication device 121 and a connector 124. The connector 124 is connected to the lane adapter 151.

A communication line (copper wire) 130 is provided between the communication device 111 and the communication device 121. The communication line 130 includes SS signal lines (TX1+, TX1−, TX2+, TX2−, RX1+, RX1−, RX2+, RX2−) for transmitting the SS signal which is a main signal, an SBU communication line for transmitting the sideband signal, a CC communication line for transmitting a power delivery signal, a power supply line (Vconn line) used for power supply, and the like.

Figure 6:
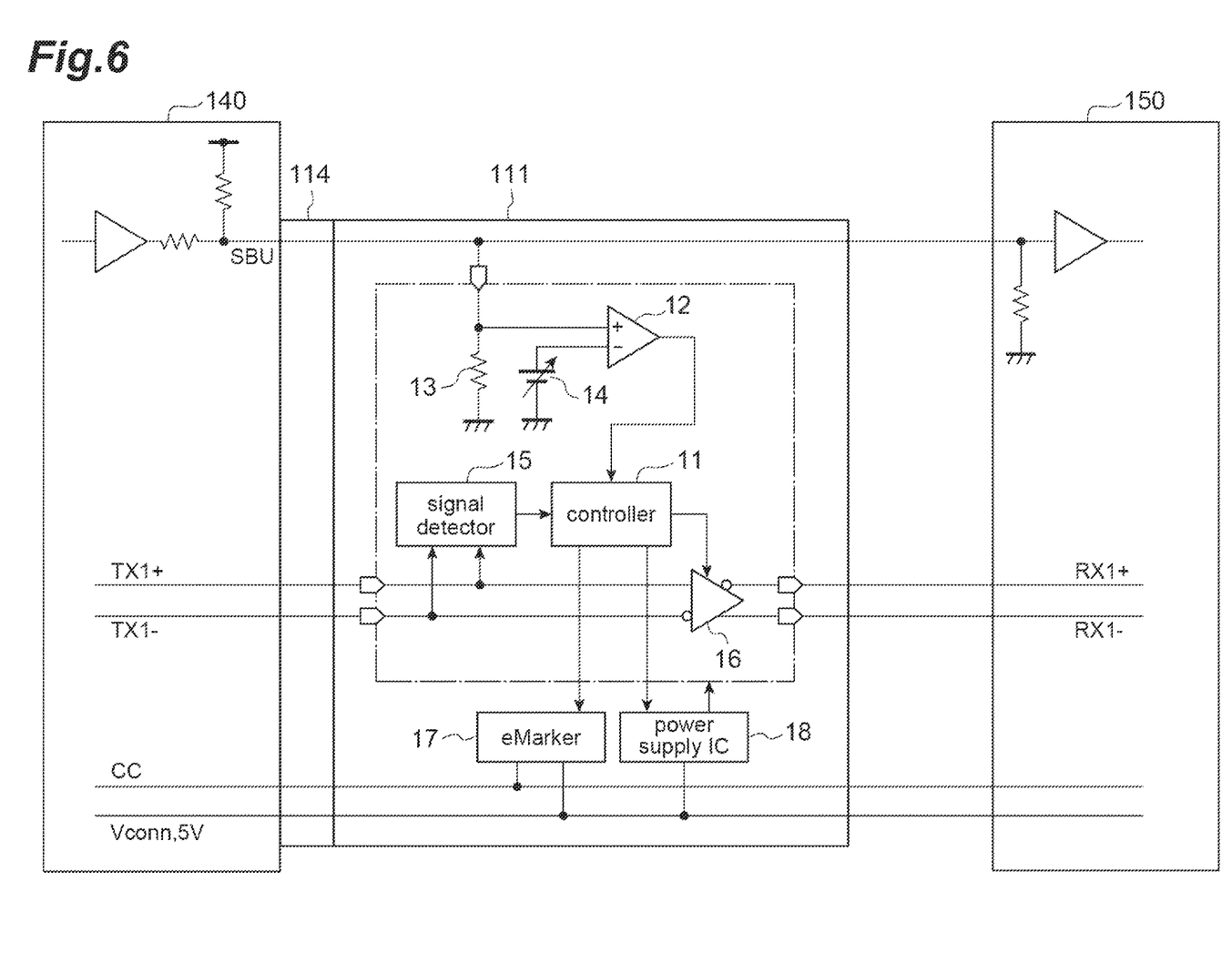
FIG. 6 is a diagram showing a configuration of a communication device 111 included in the active cable 100 according to the first embodiment.

FIG. 6 is a diagram showing a configuration of the communication device 111 included in the active cable 100 according to the first embodiment. This figure mainly shows a configuration in the communication device 111, the configuration being related to the SS signal transmitted from the lane adapter 141 (FIG. 5) of the link partner 140 to the lane adapter 151 (FIG. 5) of the link partner 150. The communication device 121 may have the same configuration as the communication device 111, but signals (TX2+, TX2−, RX2+, RX2−) are used for communication instead of the signals (TX1+, TX1−, RX1+, RX1−) shown in FIG. 6. In addition, the same configuration may be used for the received SS signal instead of the transmitted SS signal, and/or the same configuration may be used for both the transmitted SS signal and the received SS signal.

The communication device 111 includes a controller 11, a comparator 12, a resistor 13, a voltage source 14, a signal detector 15 (transmission signal detector), a redriver 16, an eMarker 17, and a power supply IC 18. These are mounted on a substrate called a paddle card. The outline of the block of the communication device 111 may indicate this substrate.

The comparator 12 is a level detector that receives the voltage value of the SBU signal line (SBU terminal) from the first input terminal, receives the reference voltage value output from the voltage source 14 from the second input terminal, and compares the voltage value of the SBU signal line with the reference voltage value to detect the level of the sideband signal, and outputs the detection result from the output terminal. The output terminal of the comparator 12 is connected to the input terminal of the controller 11, and it notifies this level detection result to the controller 11.

The resistor 13 is provided between the input terminal of the comparator 12 which is a level detector and the reference potential supply terminal, the input terminal receiving the sideband signal. The reference potential supply terminal may be a power potential supply terminal or may be a ground potential supply terminal. The resistor 13 is a pull-up resistor or a pull-down resistor. Since the resistor 13 is provided, the potential of the input terminal for receiving the sideband signal of the comparator 12 can be determined, even in a case where any one of the lane adapter 141 and the lane adapter 151 does not conform to the USB4 standard (that is, in a case where sideband communication is not performed). Therefore, it is possible to suppress unnecessary current from flowing to the comparator 12. Further, since the resistor 13 has a sufficiently large resistance value, the SBU communication can be prevented from being affected.

The signal detector 15 detects the presence or absence of the SS signal, which is a main signal transmitted from the lane adapter 141 (FIG. 5) of the link partner 140 to the lane adapter 151 of the link partner 150, and it notifies the controller 11 of the detection result. The signal detector 15 comprises a pair of input terminals to which a first differential signal (TX1+) and a second differential signal (TX1−) for transmission are input, and an output terminal that outputs the detection result to the controller 11.

The redriver 16 corrects a loss of the SS signal (particularly, a loss in a high-frequency band) at the time of transmission, and it can perform an active operation, which is performed according to its power consumption amount, to the SS signal. A retimer may be provided in place of the redriver 16. The redriver 16 comprises a pair of input terminals to which a first differential signal (TX1+) and a second differential signal (TX1−) for transmission are input, and a pair of output terminals that amplify and output these signals. The redriver 16 has an input terminal to which a control signal (low-power-consumption instruction signal) from the output terminal of the controller 11 is input. The redriver 16 controls the gain-frequency characteristic of the output signal based on the input control signal. The redriver 16 may include, for example, a continuous time linear equalizer (CTLE) circuit and a de-emphasis circuit. When the redriver 16 is read as a retimer, the retimer may further include a clock and data recovery (CDR) circuit. When the low-power-consumption instruction signal is input, the active device can be in a low-power-consumption state by, for example, reducing the amplification factor, reducing the input power supply potential, disconnecting a switch that supplies the power supply potential, or the like.

The eMarker 17 stores information of the active cable 100 to be notified to the connection partner. The stored information is, for example, the maximum current and the maximum voltage that can flow through the power supply line, whether it conforms to USB4 or it is dedicated to USB 3.2, the maximum data rate of SS signal line, and the like. The eMarker 17 notifies the connection partner of the information through the CC line.

The power supply line (Vconn line) provides 5V power supply to the power supply IC 18, the power supply IC 18 lowers the supplied voltage to a lower voltage (for example, 3.3V), and the power supply IC 18 provides the lower voltage to the controller 11, comparator 12, resistor 13, voltage source 14, signal detector 15, redriver 16, and the like.

The controller 11 receives the detection result of the sideband signal level from the comparator 12, which is a level detector, and the controller 11 receives the detection result of the presence or absence of the SS signal from the signal detector 15. When the sideband signal level stays at L level for a predetermined period of time or longer, the controller 11 sets the redriver 16, which is the active device, to the low-power-consumption state.

As described above, in the lane initialization performed at the CLd state of the lane adapter in the USB4 standard, the sideband signal is fixed to L level in Phase 1 (FIG. 4), whereas symbols are transmitted by sideband communication using the SBU communication line in Phase 2 (FIG. 4) and thereafter. After Phase 2, the sideband signal basically maintains H level, and becomes L level (start bit) of 1 bit, an arbitrary level (symbol) of 8 bits, and H level (stop bit) of 1 bit at the time of symbol transmission, and thereafter it maintains H level. Further, the data rate of the sideband signal is 1 Mbps, and the time of one bit of the sideband signal is 1 μs. Therefore, if L level of the sideband signal level continues for a time corresponding to 10 bits (10 μs), it can be determined that the lane adapter is in Phase 1 of the CLd state.

Therefore, when the sideband signal level stays at L level for a predetermined period of time (at least 10 μs), the controller 11 can set the redriver 16, which is an active device, to the low-power-consumption state. In addition to the sideband signal level, the controller 11 also checks the no-signal state of the SS signal, thereby it can more reliably determine that the lane adapter is in Phase 1 of the CLd state.

When the sideband signal level stays at L level for a predetermined period of time or longer, the controller 11 may not only set the redriver 16 to the low-power-consumption state but also set the eMarker 17 to the low-power-consumption state or set the power supply IC 18 to the low-power-consumption state. Thus, the entire communication device 111 can be brought into a state of lower power consumption. The controller can be configured by, for example, a microprocessor or a logic circuit.

The controller 11 may adjust the operation of the redriver 16, which is the active device, when the sideband signal level stays at L level for a predetermined period of time or longer. Specifically, the adjustment of the operation of the redriver 16 is, for example, adjustment of the frequency dependency in loss correction of the SS signal. When the lane adapter is in Phase 1 of the CLd state, the SS signal is in the no-signal state and a quick return to the wake state is not required, so that the operation of the redriver 16 can be adjusted.

In the present embodiment, since it is only necessary to detect that the sideband signal level stays at L level for a predetermined period of time or longer, the comparator 12 which is a level detector for this purpose can have a simple and small circuit configuration. Therefore, the communication device 111 can also have a simple configuration and can be mounted on the paddle card at low cost and low electric power.

Figure 7:
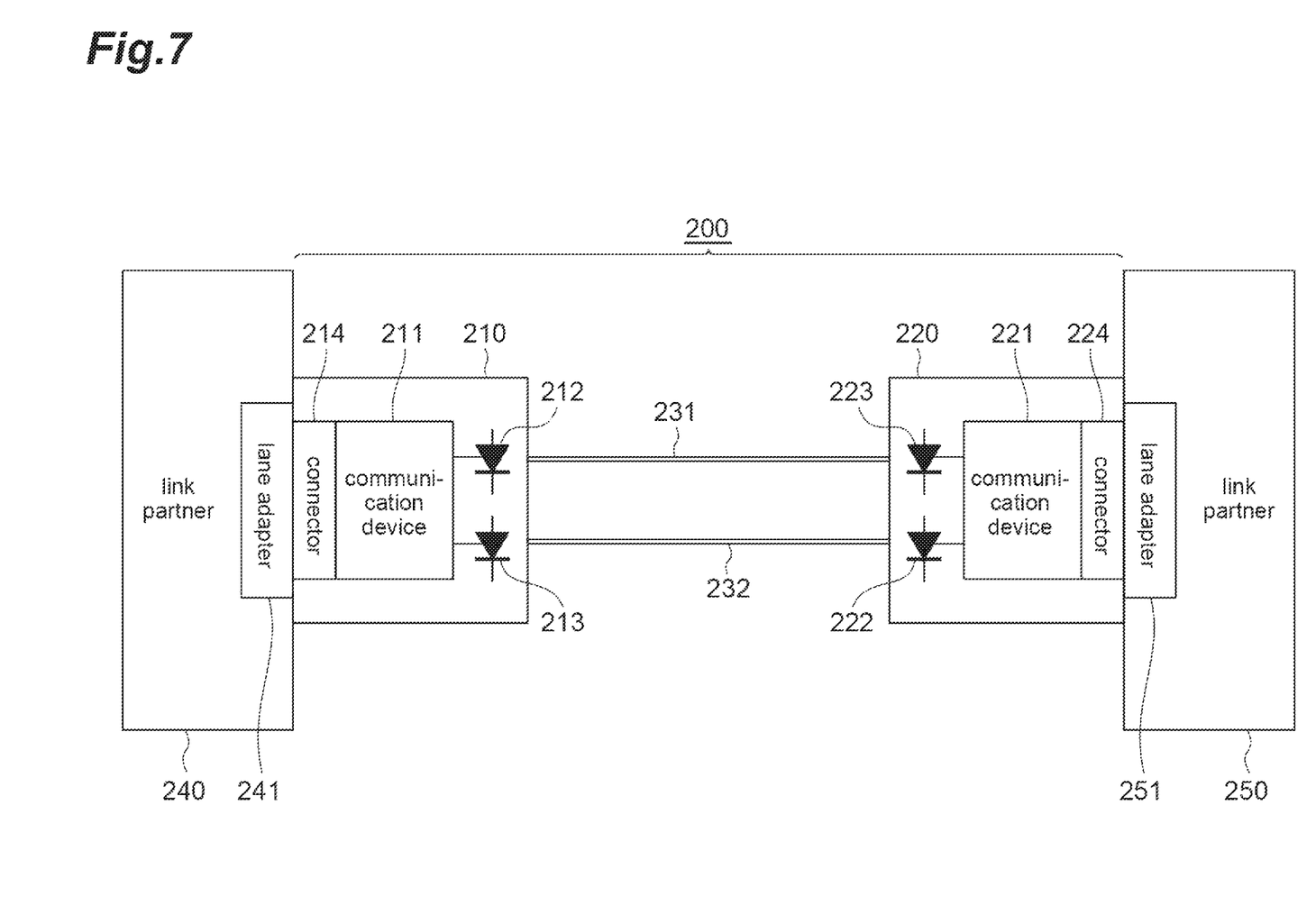
FIG. 7 is a diagram showing a configuration of an active cable 200 according to the second embodiment.

FIG. 7 is a diagram showing a configuration of an active cable 200 according to the second embodiment. The active cable 200 of the present embodiment is an active optical cable (AOC). The active cable 200 performs communication between the lane adapter 251 of one link partner 240 and the lane adapter 241 of the other link partner 250. At least one of the lane adapter 241 and the lane adapter 251 conforms to the USB4 standard.

The terminal device 210 on one side of the active cable 200 comprises a communication device 211, a laser diode 212, a photodiode 213, and a connector 214. The connector 214 is connected to the lane adapter 241. The terminal device 220 on the other side of the active cable 200 comprises a communication device 221, a laser diode 222, a photodiode 223, and a connector 224. The connector 224 is connected to the lane adapter 251.

An optical fiber 231 is provided between the laser diode 212 and the photodiode 223 as a signal line for transmitting an optical signal. An optical fiber 232 is provided between the laser diode 222 and the photodiode 213 as a signal line for transmitting an optical signal. These signal lines transmit an SS signal which is a main signal, a sideband signal, a power delivery signal, and the like.

Figure 8:
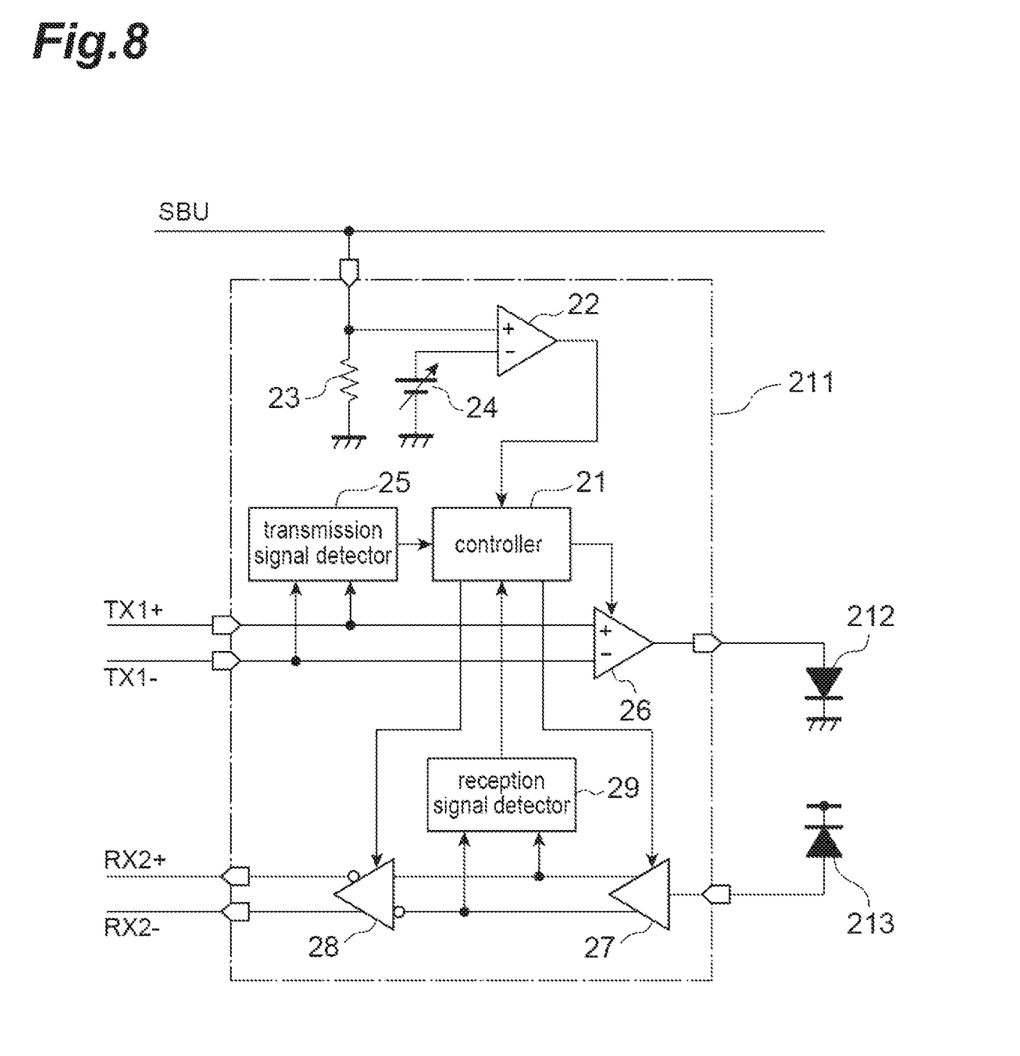
FIG. 8 is a diagram showing a configuration of a communication device 211 included in an active cable 200 according to the second embodiment.

FIG. 8 is a diagram showing a configuration of the communication device 211 included in the active cable 200 according to the second embodiment. This figure mainly shows a configuration in the communication device 211, the configuration being related to the SS signal transmitted between the lane adapter 241 of the link partner 240 and the lane adapter 251 of the link partner 250. The communication device 221 may have the same configuration as the communication device 211, but signals (TX2+, TX2−, RX1+, RX1−) are used for communication instead of the signals (TX1+, TX1−, RX2+, RX2−) as shown in FIG. 8.

The communication device 211 comprises a controller 21, a comparator 22, a resistor 23, a voltage source 24, a transmission signal detector 25, a driver (laser driver) 26, an amplification unit 27, a differential amplification unit 28 (differential amplifier), and a reception signal detector 29. Further, the communication device 211 includes the eMarker and the power supply IC shown in FIG. 6. The communication device 211, the laser diode 212, and the photodiode 213 are mounted on the substrate of the paddle card. An outer frame of the block of the communication device 211 may indicate the substrate on which the laser diode 212 and the photodiode 213 are also mounted.

The comparator 22 is a level detector that receives the voltage value of SBU signal line (SBU terminal) from the first input terminal, receives the reference voltage value output from the voltage source 24 from the second input terminal, and compares the voltage value of the SBU signal line with the reference voltage value to detect the level of the sideband signal, and it outputs the detection result from the output terminal. The output terminal of the comparator 22 is connected to the input terminal of the controller 21, and it notifies this level detection result to the controller 21.

The resistor 23 is provided between the input terminal of the comparator 22 which is a level detector and the reference potential supply terminal, the input terminal receiving the sideband signal. The reference potential supply terminal may be a power potential supply terminal or may be a ground potential supply terminal. The resistor 23 is a pull-up resistor or a pull-down resistor. Since the resistor 23 is provided, the potential of the input terminal for receiving the sideband signal of the comparator 22 can be determined, even in a case where any one of the lane adapter 241 and the lane adapter 251 does not conform to the USB4 standard (that is, in a case where sideband communication is not performed). Therefore, it is possible to suppress unnecessary current from flowing to the comparator 22. Further, since the resistor 23 has a sufficiently large resistance value, the SBU communication can be prevented from being affected.

The transmission signal detector 25 detects the presence or absence of the SS signal which is a main signal transmitted from the lane adapter 241 of the link partner 240 to the lane adapter 251 of the link partner 250, and it notifies the controller 21 of the detection result. The transmission signal detector 25 includes a pair of input terminals to which a first differential signal (TX1+) and a second differential signal (TX1−) for transmission are input, and an output terminal that outputs the detection result to the controller 21.

When there is a SS signal to be transmitted to the other side, the driver 26 provides a current signal to the laser diode 212 based on the SS signal, and outputs an optical signal from the laser diode 212 to the photodiode 223 on the other side. The driver 26 comprises a pair of input terminals to which a first differential signal (TX1+) and a second differential signal (TX1−) for transmission are input, and an output terminal that outputs a drive current for the laser diode 212 in response to these signals. The driver 26 has an input terminal to which a control signal (low-power consumption instruction signal) from the output terminal of the controller 21 is input. The driver 26 controls the magnitude of the drive current as an output signal based on the input control signal.

The amplification unit 27 receives a current signal output from the photodiode 213 that receives an optical signal output from the laser diode 222 on the other side, it converts the current signal into a voltage signal, and it outputs the voltage signal (differential signal). The amplification unit 27 is a TIA that converts the current signal into the voltage signal. The differential amplification unit 28 amplifies the voltage signal output from the amplification unit 27 and outputs the amplified signal as the SS signal.

The reception signal detector 29 includes a pair of input terminals for detecting the presence or absence of a voltage signal of a part between the amplification unit 27 and the differential amplification unit 28, and it includes an output terminal for inputting a detection result to the controller 21. That is, the reception signal detector 29 detects the presence or absence of the SS signal which is a main signal transmitted from the lane adapter 251 of the link partner 250 (FIG. 7) to the lane adapter 241 of the link partner 240. The reception signal detector 29 notifies the controller 21 of the detection result.

The controller 21 receives the detection result of the sideband signal level from the comparator 22 which is a level detector, and the controller 21 receives the detection results of the presence or absence of the SS signal from each of the transmission signal detector 25 and the reception signal detector 29. When the sideband signal level stays at L level for a predetermined period of time or longer, the controller 21 sets one or more of the active devices, which are the driver 26, the amplification unit 27, and the differential amplification unit 28, to the low-power-consumption state.

As described above, if L level of the sideband signal level continues for a time (10 μs) corresponding to 10 bits, it can be determined that the lane adapter is in Phase 1 of the CLd state. Therefore, when the sideband signal level stays at L level for a predetermined time (at least 10 μs), the controller 21 can set any one or more of the active devices, which are the driver 26, the amplification unit 27, and the differential amplification unit 28, to the low-power-consumption state. Further, the controller 21 checks the no-signal state of the SS signal in addition to the sideband signal level, thereby it can more reliably determine that the lane adapter is in Phase 1 of the CLd state.

When the sideband signal level stays at L level for a predetermined period of time or longer, the controller 21 may not only set the active device to the low-power-consumption state but also set the eMarker (FIG. 6) to the low-power-consumption state or set the power supply IC (FIG. 6) to the low-power-consumption state. Therefore, the entire communication device 211 can be brought into the lower-power-consumption state. Note that the low-power-consumption state means a state in which the power is lower than the relevant power used in the SS signal transmission, and it is preferably the power in the sleep state.

The controller 21 may adjust the operation of the driver 26, the amplification unit 27, or the differential amplification unit 28, which is an active device, when the sideband signal level stays at L level for a predetermined period of time or longer. Specifically, the adjustment of the operation of the driver 26 is, for example, an adjustment of the magnitude of the current supplied to the laser diode 212. The adjustment of the operation of the amplification unit 27 or the differential amplification unit 28 is, for example, an adjustment of frequency dependency at the time of loss correction of the SS signal and/or an adjustment of offset. The adjustments of these operations can be performed because a quick return to the wake state is not required when the lane adapter is in Phase 1 of the CLd state, and thus the SS signal is in the no-signal state. In the adjustments of the operations described above, it is possible to increase the gain particularly in the high-frequency band of the SS signal to correct the loss in the high-frequency band, when the redriver 16 or the driver 26 is used.

In this embodiment, since it is only necessary to detect that the sideband signal level is at the L level for a predetermined period of time or longer, the comparator 22 which is a level detector for this purpose can have a simple and small circuit configuration. Therefore, the communication device 211 can also have a simple configuration and can be mounted on the paddle card at low cost and low electric power.

As described above, the communication device for the USB4 standard comprises a comparator (12, 22) comprising a first input terminal connected to a sideband use (SBU) terminal (SBU line) and a second input terminal connected to a reference potential; a controller (11, 21) connected to an output terminal of the comparator (12, 22) and comprising an output terminal for low-power-consumption instruction signal output; and an active device (16, 26) connected to the output terminal of the controller (11, 21).

The active device may be a redriver 16 (or a retimer) comprising a pair of input terminals respectively connected to a terminal (TX1+) for a first transmission signal and a terminal (TX1−) for a second transmission signal.

The active device may be a laser diode driver 26 comprising a pair of input terminals respectively connected to a terminal (TX1+) for a first transmission signal and a terminal (TX1−) for a second transmission signal. The driver 26 may be a gain-adjustable current source operated by differential input. The driver 26 can be set into the low-power-consumption state by, for example, lowering the gain, lowering the power supply potential, or switching off the line that supplies the power supply potential by the input of the low-power consumption instruction signal. When the low-power consumption instruction signal is input to the amplification unit 27 (transimpedance amplifier) and/or the differential amplification unit 28, their power consumption can be reduced. The low-power-consumption instruction signal may be a signal for instructing disconnection of a switch provided in a line that supplies a power supply potential to these circuits. The number of active devices may be one or more.

The communication device comprises a transmission signal detector (15, 25) including a pair of input terminals respectively connected to a terminal (TX1+) for a first transmission signal and a terminal (TX1−) for a second transmission signal, wherein an output terminal of the transmission signal detector (15, 25) is connected to an input terminal of the controller (11, 21). When the output signal from the transmission signal detector indicates that no signal is transmitted and indicates that the output of the comparator is L level, the controller can reduce the power consumption of the active devices by outputting the low-power-consumption instruction signal that indicates reducing the power consumption of the active device. The information indicated by the output signal from the transmission signal detector is optional information for the instruction of reducing the power consumption. Therefore, the controller may output the low-power-consumption instruction signal based on only the output signal from the comparator.

REFERENCE SIGNS LIST

11: controller, 12: comparator, 13: resistor, 14: voltage source, 15: signal detector, 16: redriver, 17: eMarker, 18: power supply IC, 21: controller 22: comparator, 23: resistor, 24: voltage source, 25: transmission signal detector, 26: driver, 27: amplification unit, 28: differential amplification unit, 29: reception signal detector, 100: active cable, 110: terminal device, 111: communication device, 114: connector, 120: terminal device, 121: communication device, 124: connector, 130: communication line, 140: link partner, 141: lane adapter, 150: link partner, 151: lane adapter, 200: active cable, 210: terminal device, 211: communication device, 212: laser diode, 213: photodiode, 214: connector, 220: terminal device, 221: communication device, 222: laser diode, 223: photodiode, 224: connector, 231,232: optical fiber, 240: link partner, 241: lane adapter, 250: link partner, 251: lane adapter.

The invention claimed is:

1. A communication device provided in an active cable that performs communication between a first lane adapter and a second lane adapter, at least one of the first and second lane adapters conforming to a USB4 standard, the communication device comprising:
one or more active devices configured to perform an active operation, which is performed according to its power consumption amount, to a main signal transmitted between the first lane adapter and the second lane adapter; and
a level detector configured to detect a level of a sideband signal transmitted between the first lane adapter and the second lane adapter; and
a controller configured to set any of the active devices to a low-power-consumption state when the level of the sideband signal detected by the level detector stays at L level for a predetermined period of time or longer.

2. The communication device according to claim 1, wherein the active cable is an active copper cable, and wherein each of a redriver and a retimer is one of the active devices, and the controller sets the redriver or the retimer to the low-power-consumption state when the level of the sideband signal detected by the level detector stays at L level for a predetermined period of time or longer.

3. The communication device according to claim 1, wherein the active cable is an active optical cable, and wherein each of a laser driver and a transimpedance amplifier is one of the active devices, and the controller sets the laser driver or the transimpedance amplifier to the low-power-consumption state when the level of the sideband signal detected by the level detector stays at L level for a predetermined period of time or longer.

4. The communication device according to claim 1, wherein the controller sets a device or devices other than the active devices to the low-power-consumption state when the level of the sideband signal detected by the level detector stays at L level for a predetermined period of time or longer.

5. The communication device according to claim 1, wherein the controller adjusts an operation of any of the active devices when the level of the sideband signal detected by the level detector stays at L level for a predetermined period of time or longer.

6. The communication device according to claim 1, further comprising a resistor provided between an input terminal for the sideband signal, in the level detector and a reference potential supply terminal.

7. An active cable comprising the communication device according to claim 1.

8. An active cable comprising the communication device according to claim 2.

9. An active cable comprising the communication device according to claim 3.

10. An active cable comprising the communication device according to claim 4.

11. An active cable comprising the communication device according to claim 5.

12. An active cable comprising the communication device according to claim 6.

13. A communication device for compatibility with a USB4 standard, comprising:
a comparator comprising:
a first input terminal connected to a sideband use (SBU) terminal, and
a second input terminal connected to a reference potential;
a controller connected to an output terminal of the comparator and comprising an output terminal for low-power-consumption instruction signal output; and
an active device connected to the output terminal of the controller.

14. The communication device according to claim 13, wherein the active device is a redriver comprising a pair of input terminals respectively connected to a terminal (TX1+) for a first transmission signal and a terminal (TX1−) for a second transmission signal.

15. The communication device according to claim 13, wherein the active device is a laser diode driver comprising a pair of input terminals respectively connected to a terminal (TX1+) for a first transmission signal and a terminal (TX1−) for a second transmission signal.

16. The communication device according to claim 13, comprising a transmission signal detector including a pair of input terminals respectively connected to a terminal (TX1+) for a first transmission signal and a terminal (TX1−) for a second transmission signal,
wherein an output terminal of the transmission signal detector is connected to an input terminal of the controller.

17. An active cable comprising the communication device according to claim 13.

18. An active cable comprising the communication device according to claim 14.

19. An active cable comprising the communication device according to claim 15.

20. An active cable comprising the communication device according to claim 16.

* * * * *